United States Patent
Mordani et al.

(10) Patent No.: US 9,344,494 B2
(45) Date of Patent: May 17, 2016

(54) FAILOVER DATA REPLICATION WITH COLOCATION OF SESSION STATE DATA

(75) Inventors: Rajiv P Mordani, Sunnyvale, CA (US); Mahesh Kannan, Santa Clara, CA (US)

(73) Assignee: Oracle International Corporation, Redwood City, CA (US)

( * ) Notice: Subject to any disclaimer, the term of this patent is extended or adjusted under 35 U.S.C. 154(b) by 374 days.

(21) Appl. No.: 13/221,546

(22) Filed: Aug. 30, 2011

(65) Prior Publication Data

US 2013/0054822 A1    Feb. 28, 2013

(51) Int. Cl.
| | |
|---|---|
| G06F 15/16 | (2006.01) |
| H04L 29/08 | (2006.01) |
| G06F 11/14 | (2006.01) |
| H04L 29/14 | (2006.01) |
| G06F 11/20 | (2006.01) |

(52) U.S. Cl.
CPC ........ *H04L 67/1034* (2013.01); *G06F 11/1482* (2013.01); *H04L 69/40* (2013.01); *G06F 11/2038* (2013.01)

(58) Field of Classification Search
CPC ............... H04L 29/06319; H04L 29/06394; H04L 29/06401
USPC ........................................................ 709/228
See application file for complete search history.

(56) References Cited

U.S. PATENT DOCUMENTS

| | | | |
|---|---|---|---|
| 6,108,300 A | 8/2000 | Coile et al. | |
| 6,539,494 B1 * | 3/2003 | Abramson | ............ G06F 11/203 714/4.3 |
| 6,859,834 B1 | 2/2005 | Arora et al. | |
| 6,922,791 B2 | 7/2005 | Mashayekhi et al. | |
| 6,944,788 B2 | 9/2005 | Dinker et al. | |
| 7,099,915 B1 | 8/2006 | Tenereillo et al. | |
| 7,185,096 B2 | 2/2007 | Kalyanavarathan et al. | |
| 7,308,502 B2 | 12/2007 | Rouault | |
| 7,313,722 B2 | 12/2007 | Saika | |
| 7,370,329 B2 | 5/2008 | Kumar et al. | |
| 7,437,594 B1 * | 10/2008 | Mount | ................ G06F 11/2035 709/224 |
| 7,480,816 B1 | 1/2009 | Mortazavi et al. | |
| 7,689,862 B1 | 3/2010 | Bharthulwar | |
| 7,702,791 B2 | 4/2010 | Halpern et al. | |
| 7,702,947 B2 | 4/2010 | Peddada | |

(Continued)

OTHER PUBLICATIONS

U.S. Appl. No. 13/193,296, filed Jul. 28, 2011; Rajiv P. Mordani.

*Primary Examiner* — Kevin Bates
*Assistant Examiner* — S M Rahman
(74) *Attorney, Agent, or Firm* — Robert C. Kowert; Meyertons, Hood, Kivlin, Kowert & Goetzel, P.C.

(57) ABSTRACT

A method, system, and medium are disclosed for performing failover data replication with colocation of session state data. In servicing a client request, a first session is created on a primary server. A first portion of session data comprises a state of the first session and is stored on the primary server. An identifier of the first session is stored on the primary server. One or more backup servers are selected for backup of the first portion of session data. A second session is created on the primary server. A second portion of session data comprises a state of the second session and is stored on the primary server. The same backup server(s) are selected for backup of the second portion based on the stored identifier of the first session. The primary server replicates the first and second portions of session data into memory space of the backup servers.

20 Claims, 5 Drawing Sheets

(56) References Cited

U.S. PATENT DOCUMENTS

| | | |
|---|---|---|
| 7,770,058 B2 | 8/2010 | Phan |
| 7,774,473 B2 | 8/2010 | Elving et al. |
| 7,860,975 B2 | 12/2010 | Elving et al. |
| 8,065,559 B2 | 11/2011 | Kamath et al. |
| 2003/0005350 A1 | 1/2003 | Koning et al. |
| 2003/0167331 A1* | 9/2003 | Kumar et al. ............... 709/227 |
| 2007/0192326 A1 | 8/2007 | Angal et al. |
| 2007/0220302 A1 | 9/2007 | Cline et al. |
| 2008/0244177 A1 | 10/2008 | Crescenti et al. |
| 2008/0263390 A1 | 10/2008 | Baba et al. |
| 2009/0144344 A1* | 6/2009 | McBride et al. ............... 707/204 |
| 2010/0325485 A1 | 12/2010 | Kamath et al. |
| 2011/0010560 A1 | 1/2011 | Etchegoyen |
| 2013/0031403 A1* | 1/2013 | Mordani ................ H04L 67/28 714/4.11 |

\* cited by examiner

FIG. 1

Interconnect 285

FAILOVER DATA REPLICATION WITH COLOCATION OF SESSION STATE DATA

BACKGROUND

Web applications are often deployed using multiple interconnected computers configured as a cluster. A cluster configuration can enable various benefits for the system, such as increased scalability and availability.

A cluster can provide scalability by enabling the system to spread a load across multiple nodes of the cluster. For example, a cluster may be used to deploy a web application by executing a separate application server instance on each node. Because each application server instance is capable of handling web requests, the cluster enjoys the combined computational resources of all the nodes in the cluster. Often, the cluster includes a load-balancer that receives network requests, applies some load-balancing algorithm to decide which server instance should service the request, and forwards the request to the determined node. By applying such load-balancing algorithms, a load-balancer may optimize cluster utilization to avoid hotspots.

Another property that cluster configurations may enhance is availability. For a web application executing in a non-clustered environment, a server failure makes the web application unavailable until the server is repaired. In contrast, cluster environments enable failover techniques, whereby, when one node fails (primary server), another node (recovery server) may service the load of the failed node. Failover techniques may be implemented such that the server failure is transparent to clients.

One difficulty of implementing transparent failover for web applications is that servers often maintain respective session data for each client. Session data is data that the server must maintain for the duration of a client's session (i.e., session scope), rather than for the duration of only one request (i.e., request scope). For example, an e-commerce web application might maintain session data indicating the items that a user has stored in his shopping cart. The system must maintain such data across multiple requests so that the user's shopping cart maintains the items, even after the user navigates to a new page. To implement transparent failover, a recovery server must have access to a client's session data.

Different methods exist for implementing transparent failover for web applications that store session data. In some systems, servers write session data to a persistent back-end store, such as a shared database or file system. If a server crashes, then the recovery server may access the session data in the shared persistent storage. Unfortunately, writing session data to shared persistent store often imposes a significant performance penalty. Furthermore, implementing the persistent store implicates additional cost and complexity.

Another technique for implementing transparent failover is in-memory replication of session data. In such systems, a server backs up its session data onto one or more other servers (backup servers) in the cluster. If the node fails, the load balancer routes the next client request to another server, which then uses some protocol to locate the backup servers. The server may either retrieve the session data from the backup servers and serve the client or forward the request to the backup servers. Whichever server handles the request also chooses one or more new backup servers to which it replicates the session data.

When session data is replicated to other servers in the cluster, different components on a single server may replicate their respective session data in a manner that is independent of one another. Therefore, different portions of the session data may be replicated to different backup servers. When one portion of the session data on a server is replicated to one backup server and another portion of the session data is replicated to another backup server, recovering from a failure of the server may require additional time and resources.

SUMMARY

A method, system, and medium are disclosed for performing failover data replication with colocation of session state data. In some embodiments, in servicing a client request, a first session is created on a primary server. A first portion of session data, comprising a state for the first session, is generated by a first component (e.g., a first container) and stored with an identifier of the first session on the primary server. One or more backup servers are selected for backup of the first portion of session data. A second session is created on the primary server. A second portion of session data, comprising a state for the second session, is generated by a second component (e.g., a second container) and stored with an identifier of the second session on the primary server. In some embodiments, each of the states may be generated by one or more components or containers. The same backup servers are selected for backup of the second portion of session data based on the stored identifier of the first session. The primary server replicates the first and second portions of session data into memory space of the backup servers.

In some embodiments, the identifier of the first session is stored in a thread-local variable. The one or more backup servers may be selected for backup of the first and second portions of session data by calculating a function of the identifier of the first session as stored in the thread-local variable.

In some embodiments, the primary server sends a response to the client, wherein the response includes an indication of the one or more backup servers. When the client sends a subsequent request, it includes an indication of the backup servers. In some embodiments, the client may encode the indication of the backup servers in a URL in the response or in a cookie. If the primary server is unavailable, the cluster determines a recovery server from among the backup servers indicated by the request. The chosen recovery server may then service the request.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

An application server, such as Oracle's GlassFish™, may implement failover using in-memory data replication. According to various embodiments, the in-memory replication technique may comprise making copies of session data in the memory of multiple servers in the cluster. Different portions of session data (e.g., session data from different sessions) may be colocated on the same set of backup servers for efficient recovery after a failover. When a server services a request, it sends the client failover information identifying all the backup servers that store a copy of the session data. The server may include the failover information in a cookie, encode it in a URL sent to the client (e.g., URL rewriting), or use an alternate means of communication. The client may then include the failover information (or an indication thereof) in subsequent requests, such as by including the cookie or encoding the information in the request URL. If the primary server fails, the system can use the failover information sent by the client to locate and route the request to an appropriate recovery server. For example, a load-balancer may receive the request, detect that the primary server has failed, and in response, forward the request to an appropriate recovery server identified by the failover information. Because the chosen recovery server stores the session data in memory (or other local replica cache), the chosen server need not incur the overhead of finding the session replica on another node. For example, since the chosen server has the session data in local memory, the chosen server need not broadcast a search message to the entire cluster to find a backup server and then pull the session data from the backup server.

Figure 1:
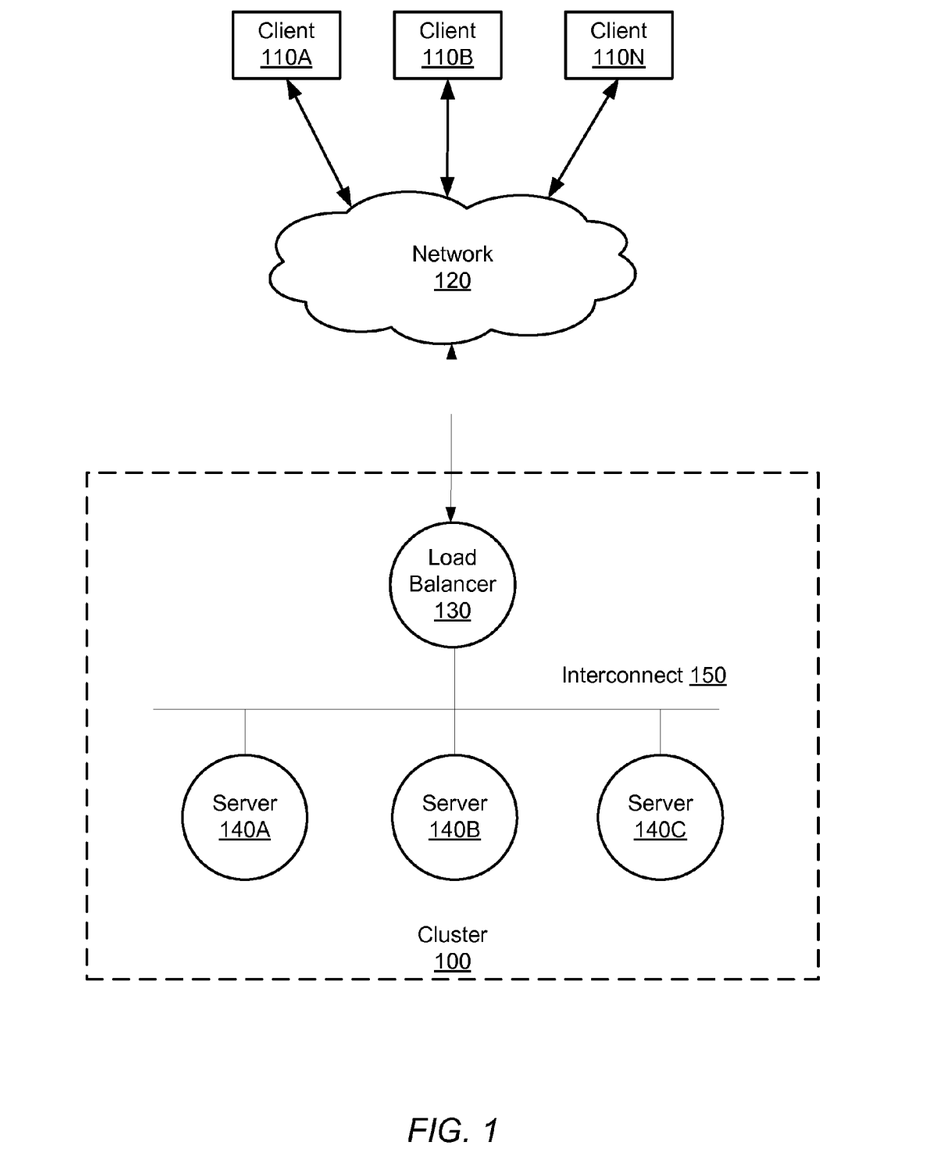
FIG. 1 is a block diagram illustrating a networked computer system including a server cluster, according to some embodiments.

FIG. 1 is a block diagram illustrating an example of a networked computer system including a server cluster, according to some embodiments. The illustrated embodiment includes some number of clients 110A and 110B through 110N connected to cluster system 100 via network 120. Clients 110A-110N may include any number of devices (e.g., desktops, laptops, mobile devices, etc.) and/or software applications (e.g., web browsers) configured to connect to server resources over a network. Network 120 may include one or more networks, such as a local area network or wide area network, such as the Internet. Clients 110A-110N are configured to request and receive service from cluster 100.

As illustrated in the example, cluster 100 may include four nodes: three application servers (140A-140C) and a load balancer (130). The nodes are connected via interconnect 150, which may correspond to any type of point-to-point, broadcast (e.g., Ethernet), or other network capable of facilitating communication between the four nodes. Each node corresponds to a software instance, which may be executing on its own physical or virtual machine. For example, each of servers 140A-140C may be a separate instance of an Oracle Glassfish™ server executing on a separate physical or virtual machine. The server instances may be configured to cooperate with the other nodes in cluster 100 to deploy a single distributed web application.

Load balancer 130 may be configured to receive client requests via the network 120 and issue those requests to different ones of servers 140A-140C. Load balancer 130 may record which server is servicing which client and issue subsequent requests from a given client to the same application server. This technique may be referred to herein as "sticky" load balancing. The load balancer may be configured to spread load around to servers 140A-140C in a manner that avoids hotspots and optimizes the cluster performance.

Figure 2:
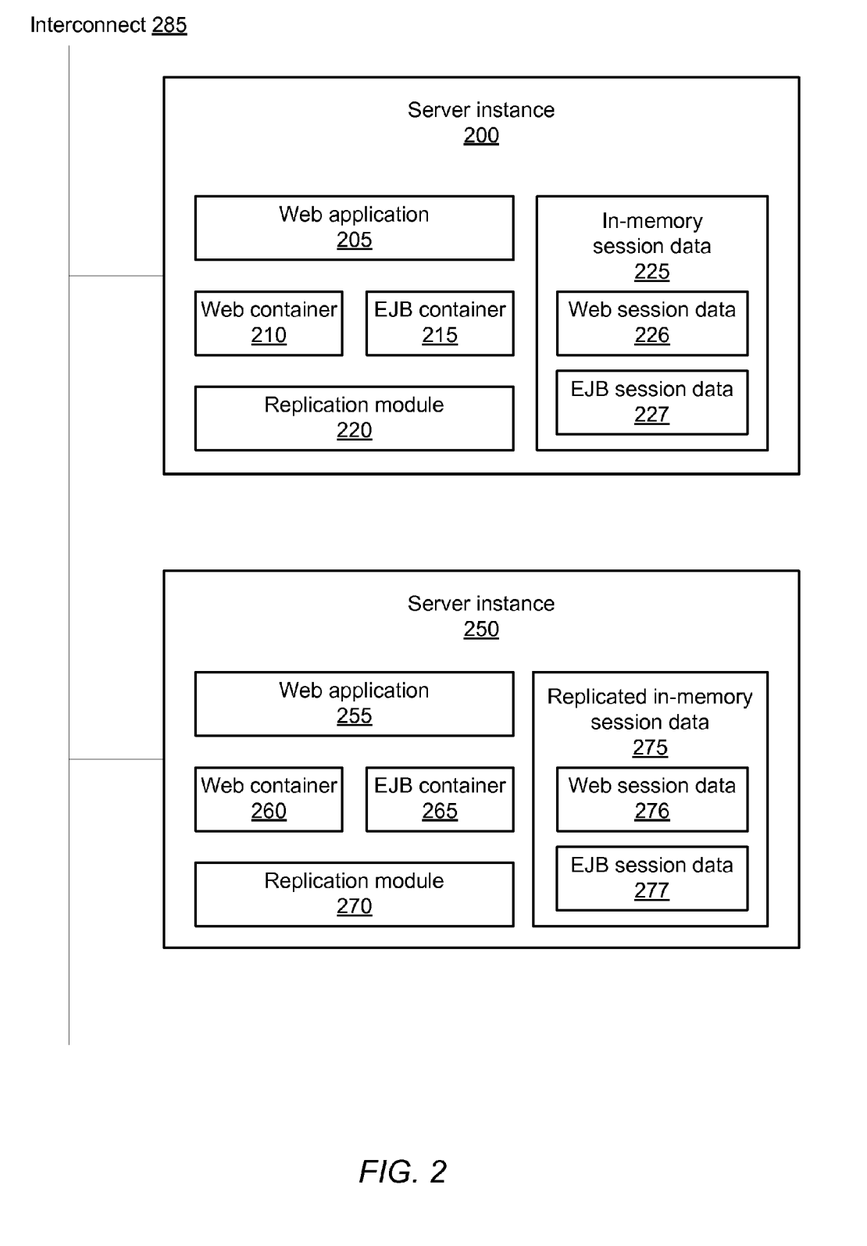
FIG. 2 is a block diagram illustrating various components of two application server instances in a cluster configured to perform transparent failover, according to various embodiments.

FIG. 2 is a block diagram illustrating various components of two application servers in a cluster configured to perform transparent failover, according to various embodiments. In some embodiments, server instances 200 and 250 may correspond to two of servers 140A-140C in FIG. 1 (e.g., two Glassfish™ application servers). For clarity in this disclosure, it is assumed that each server executes on its own physical or virtual machine. However, it should be understood that multiple software components may reside and execute concurrently on the same physical or virtual hardware.

Server instance 200 and server instance 250 are connected via interconnect 285 in a cluster configuration. Interconnect 285 may correspond to interconnect 150 of FIG. 1, and it may be used to carry data between different nodes in the cluster (e.g., server instances 200 and 250).

Server instance 200 executes web application 205 and supports it with a runtime environment. Web application 205 may correspond to any web application providing service to remote clients, such as clients 110A-110N in FIG. 1. According to FIG. 2, the supporting runtime environment includes at least web container 210, Enterprise Java Beans (EJB) container 215, and replication module 220. In some embodiments, the supporting runtime environment may include other and/or additional containers and/or components, such as a single-sign-on module.

Web container 210 provides web application 205 with a runtime environment that may include such functionality as components, concurrency, lifecycle management, transaction management, deployment, and/or other services. The web container may make such services available to web application 205 through one or more APIs and/or manage components of web application 205 transparently.

EJB container 215 may provide a runtime environment for Enterprise Java Beans (i.e., managed, modular building blocks of web application 205). The container may handle various aspects of a bean's operation within the application server and act as an intermediary between the user-written business logic within the bean and the rest of the server environment. In various embodiments, the EJB container may provide beans with various services, such as transaction support, resource pooling, automatic synchronization with persistent storage, etc.

As web application 205 executes, web container 210 and EJB container 215 may store various session data in memory (e.g., in-memory session data 225). As described above, session data corresponds to each user session being handled by service instance 200. As such, the data must be persisted so long as the user's session is active.

In-memory session data 225 may store various session-scoped objects on behalf of different containers, such as web container 210 and EJB container 215. For example, in-memory session data 225 may include session-scoped objects stored on behalf of web container 210. Likewise, in-memory session data 225 may include stateful session beans stored on behalf of EJB container 215. Containers 210 and/or 215 may be configured to create, store, and maintain such session objects in memory.

The session data stored by web container 210 may differ from the session data stored by EJB container 215. Accordingly, the in-memory session data may store both web session data 226 and EJB session data 227. Additional containers (not shown) may likewise create, store, and maintain various container-specific or session-specific session state data in a memory associated with the server instance 200.

According to the illustrated embodiment, server instance 200 further includes replication module 220, which may be configured to facilitate replication of in-memory session data 225 onto one or more backup servers. Replication module 220 may expose an API to web container 210 and/or to EJB container 215 for storage and manipulation of in-memory session data. For example, the replication module API may include interfaces usable to (1) store, (2) retrieve, (3) update, and/or (4) delete data objects in session data 225. In some embodiments, the data may include any serializable object, such as an HTTP session object, a stateful EJB, or even any "plain old Java object" (POJO).

As described above, the replication module enables various server components (e.g., web container 210, EJB container 215) to easily replicate the session data onto other server instances. In FIG. 2, server instance 200 includes containers 210 and 215, which store in-memory session data 225 in the system memory. The containers may use replication module 220 to back up session data 225 by replicating the session data into the memory of one or more other cluster nodes. In the illustrated embodiment, replication module 220 has chosen server instance 250 as a backup server and replicated in-memory session data 225 onto server instance 250 as replicated in-memory session data 275. Server instance 250 also includes other components analogous to those of instance 200, including web application 255, web container 260, and EJB container 265. To perform the replication, replication module 220 may communicate with an analogous replication module 270 on server instance 250. Thus, the replication modules on the different servers of the cluster may collectively implement a replication layer. In various embodiments, the replication layer may be implemented as modules on each server (as depicted), or on a separate hardware infrastructure, such as a separate dedicated cluster.

As will be described in greater detail below, the transparent failover technique may ensure that different objects in the session data are replicated to the same backup server instance. As shown in FIG. 2, for example, both web session data 226 and EJB session data 227 may be replicated to the selected backup server instance 250. Therefore, the replicated in-memory session data 275 may include both web session data 276 and EJB session data 277. The grouping of different portions or different types of session state data in a server is referred to herein as colocation. In some embodiments, both web session data 226 and EJB session data 227 may be replicated to a plurality of other server instances in the cluster, such that each backup server instance stores a copy of both web session data 226 and EJB session data 227.

A replication module may be configured to determine one or more backup servers automatically and/or transparently to the containers. For example, in response to a request to replicate a given object, the replication module may determine the one or more backup servers using a consistent hash algorithm. In one such example, the hash algorithm may use a unique session identifier and a representation of the current view of the cluster (e.g., number of available server instances) to determine a set of one or more server instances in the cluster to use as backup servers. The hashing algorithm may be consistent such that a hash value may be consistently reproduced given the same session identifier and cluster view. As described below, using a consistent hashing algorithm enables a server instance to determine a recovery server in some embodiments.

According to some embodiments, the system may communicate an indication of the backup server instances to the client. For example, the system may include this information (e.g., the result of the consistent hash calculation) in a cookie that it sends to the client. For purposes of explanation, the embodiments described below communicate the information using a cookie, but it should be understood that various other mechanisms are possible for communicating with a client (e.g., embedding information in a URL using URL re-writing). It is intended that all such mechanisms be within the scope of this disclosure.

According to various embodiments, the client may echo the failover information back to the system by including the information in any subsequent requests (e.g., by including the cookie, encoding the failover information in the request URL, etc.). Thus, if the primary server that is servicing the client has crashed or is otherwise unresponsive, the system may determine a recovery server from the backup servers indicated by the backup information in the request.

In some embodiments, when a new server instance joins the cluster, the replication module may use the consistent hash function to choose the new server instance as a backup server and/or stop using a different node in the cluster as a backup server. This may reduce memory requirements on the previous backup server by freeing the previous backup server from needing to store a copy of the session data from the primary server. When the new server is selected as the new backup server, the replication modules may replicate the session data to this new backup server even if the original backup server is running. This means that there may be reduced network traffic between the primary server and the old backup server. If the primary server crashes, the load balancer will route the traffic to the new backup server based on the information received from the client (e.g., the indication of the backup server in the cookie or URL). Spreading out backup server responsibilities to newly added servers reduces the number of client requests that the original backup server had to serve on failover. Indirectly, it also reduces the network traffic between load balancer and old backup server. Thus, as the number of servers in the cluster increases, the backup activity may be automatically spread among the servers to balance backup activity load.

Figure 3:
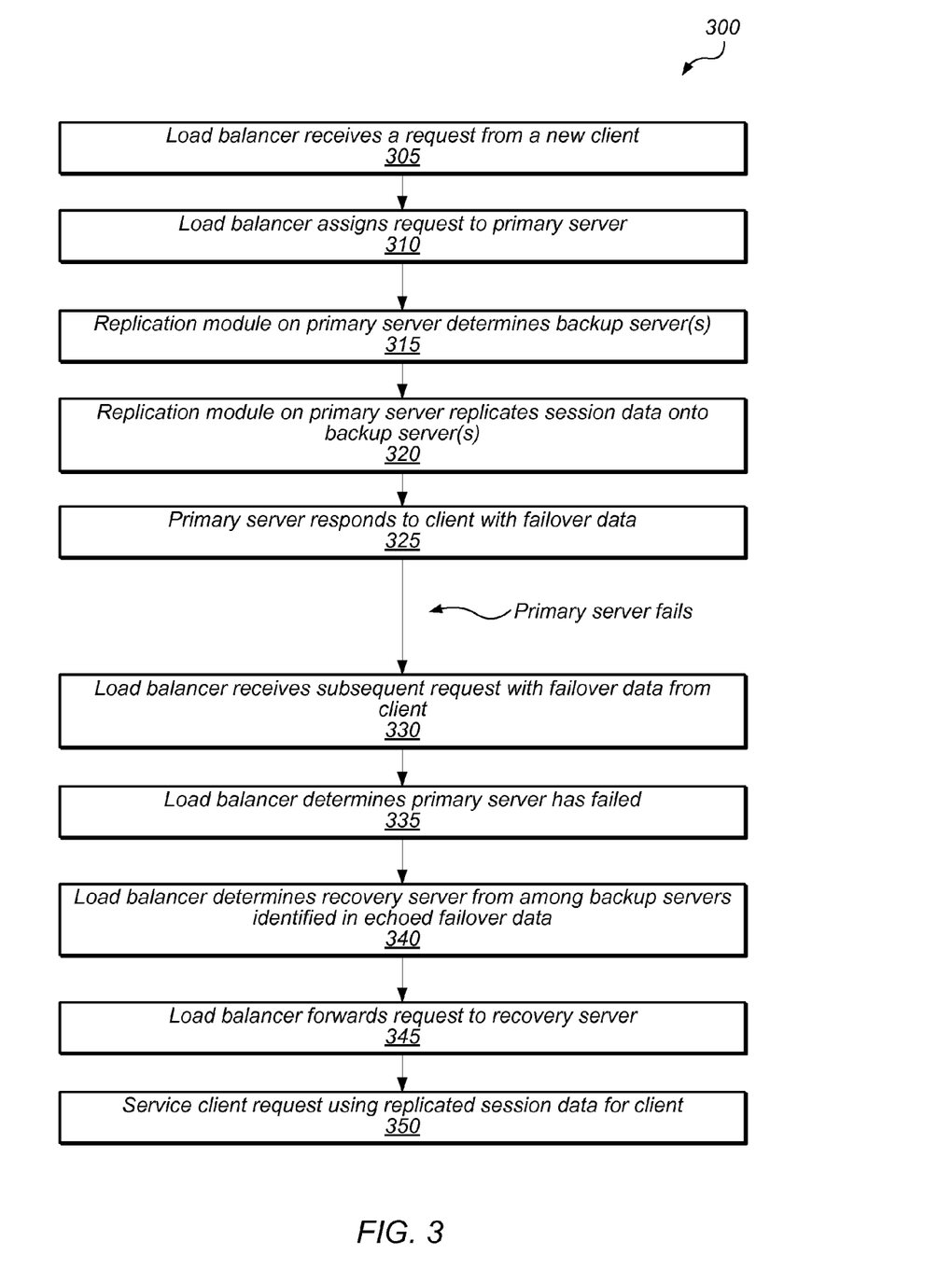
FIG. 3 is a flow diagram illustrating a method for implementing transparent failover with client-echoed failover information, according to some embodiments.

FIG. 3 is a flow diagram illustrating a method for implementing transparent failover with client-echoed failover information, according to some embodiments. The method of FIG. 3 may be performed by an application server cluster, such as cluster 100 of FIG. 1, which includes a load balancer node (e.g., 130) and multiple server instances (e.g., 200 and 250 of FIG. 2). In some embodiments, some of the method elements shown may be performed concurrently, in a different order than shown, or may be omitted. Additional method elements may also be performed as desired. Any of the method elements described may be performed automatically (i.e., without user intervention).

Method 300 begins when the load balancer receives a request from a new client, as shown in 305. The load balancer may correspond to load balancer 130 of FIG. 1. The load balancer may be set up as a proxy server for the cluster, which is configured to receive requests for service and delegate those requests to one of a plurality of server instances in a manner that avoids workload hotspots and effectively exploits the cluster's computing resources.

As shown in 310, the load balancer uses a load-balancing algorithm to assign the request to a primary server. Because the request is new (i.e., the client does not have a pre-established relationship (affinity) with a particular server on the cluster), the load balancer assigns the request to a server in a manner that balances load on the cluster. For example, the load balancer may assign work in a round robin or random fashion. Alternatively, the load balancer may monitor workload on the different servers and assign new clients to the least-loaded server.

In some embodiments, the load balancer may be configured to perform session-based sticky allocation. When such a server receives a client request associated with a session that has a pre-established affinity to a primary server, the load balancer may assign the request to that same primary server. Such an allocation may be efficient because the primary server already holds the client's session data in memory.

As shown in 315, the replication module on the primary server determines one or more backup servers. As described above, the replication module may determine the backup servers using a consistent hash algorithm. For example, the consistent hash algorithm may use a unique session identifier (e.g., assigned by one or more of containers on the server) and a view of the current cluster state (e.g., the number of active server instances in the cluster) to determine a set of one or more backup servers.

As shown in 320, the replication module on the primary server may replicate session data onto the one or more backup servers determined in 315. As described above, the replication module may expose a programmatic interface by which a container (or other component) may store, retrieve, and/or manipulate backup session data. By encapsulating the backup complexity within the replication module, the container need not be directly aware of the particular backup servers being used. Rather, the replication module may transparently choose and interact with the backup servers in response to API invocations by the container. As will be described below with respect to FIG. 4, different portions of the session data may be replicated together to the one or more backup servers.

As shown in 325, the primary server sends a response to the client and includes in the response an indication of the one or more backup servers. This indication of the backup servers is referred to generally herein as failover data. As discussed above, the primary server may communicate the failover data in a cookie that the client is expected to echo back in subsequent requests. In some embodiments, the cookie may indicate that the client should echo the cookie contents back with subsequent requests.

If the load balancer implements sticky allocation, then it may be configured to route any subsequent requests associated with the same session to the primary server. The load balancer may record this affinity internally. Between 325 and 330, the load balancer may receive any number of additional requests from the client and forward the requests to the primary server, and the primary server may service the requests. Servicing the request may comprise adding new session data and/or manipulating existing session data. The replication module may transparently ensure that the additional and manipulated data is properly mirrored onto the backup servers.

As indicated in FIG. 3, at some point between the operations shown in 325 and 330, the primary server fails. The failure may comprise a software malfunction, a hardware failure, a networking failure, and/or any other condition that makes the primary server unable to receive and respond to subsequent client requests.

As shown in 330, the load balancer receives a subsequent request from the client. The request includes the failover data that the primary server has been sending to the client. As discussed above, the failover information identifies the set of servers that hold a copy of the client's session data in memory.

As shown in 335, the load balancer detects that the primary server has failed. In response to detecting that the primary server has failed, the load balancer determines (in 340) a recovery server from among the backup servers identified in the echoed failover data. In some embodiments, the load balancer may choose an arbitrary one of the indicated backup servers as the recovery server. In other embodiments, the load balancer may apply various load balancing considerations. For example, the load balancer may choose the least loaded of the backup servers to be the recovery server (i.e., to become the new primary server for the client).

As shown in 345, the load balancer forwards the request to the chosen recovery server. In response to receiving the request, the recovery server may determine that it is now the new primary server for this client. Because the recovery server was a backup server, it holds a copy of the client's session data in memory. The recovery server may therefore use the replicated session data to service the client request, as in 350. The replicated session data on the recovery server may include different session state objects, e.g., objects created by different containers on the source server instance.

In some embodiments, servicing the first client request, as shown in 350, may comprise instantiating the replicated session data into one or more in-memory objects. For example, in some embodiments, backup servers may be configured to store the replicated session data in an archival format, such as a serialized format, in order to reduce the overhead of maintaining the backup copies. In such embodiments, when a backup server assumes the role of primary server, it may need to convert the session data from the archival (e.g., serialized) format into an executable, in-memory (e.g., object) format. The new primary server may then determine an updated set of backup servers and replicate session data for the client onto those backup servers.

As described above, method 300 implements a transparent failover technique. The method may be transparent to the client because the client need not know that the cookie contents indicate backup servers. Instead, the client returns the cookie just like any other cookie without the need for any special modification. Because the cookie identifies the backup servers, the load balancer can easily determine a recovery server when a primary server fails. The load balancer can determine the recovery server without sending broadcast or other messages to the cluster nodes. The technique thereby reduces the time and computational expense of performing the failover.

In some embodiments, the scheme may be used to implement transparent failover, even when the cluster does not include a load balancer or if the load balancer is unaware of the failover information being echoed by the client. In such embodiments, when the primary server fails, the load balancer forwards the request to any server in the cluster. Because the load balancer is unaware of the failover data contained in the request, the load balancer may forward the request to a recovery server that does not store a copy of the client's session data. However, if the recovery server is aware of the failover-information echoing scheme, it may use the failover information to identify a backup server that stores a copy of the client's session data. After determining the identity of a backup server, the recovery server may forward the request to the backup server, thereby making the backup server the new primary server. In other embodiments, the recovery server may request that the backup server send a copy of the session data to the recovery server and the recovery server may then become the client's new primary server. If, for whatever reason, the recovery server cannot use the failover information to locate a backup server, it may default to performing a broadcast to the whole cluster to get the session data.

As described above with respect to FIG. 3, when an HTTP request is received by a primary server, an HTTP session is created to service the request. A corresponding HTTP session identifier is assigned (e.g., by the web container), and the web container on the primary server creates web session data related to servicing the request. One or more backup servers are determined, and the web session data is replicated to the one or more backup servers. In some embodiments, receipt of the HTTP request may also result in the creation of an EJB session on the primary server. The EJB session may be associated with an EJB session identifier (e.g., created by the EJB container) and EJB session data. In some embodiments, the EJB session identifier will differ from the HTTP session identifier. If a different set of one or more backup servers were to be determined for the EJB session data based on the difference between the two session identifiers, then recovery after a failover (e.g., including retrieval of the different types of session state data) might be slower and more resource-intensive. Therefore, colocation techniques may be employed to ensure that different portions or different types of session state data are replicated from a primary server to the same set of one or more backup servers.

Figure 4:
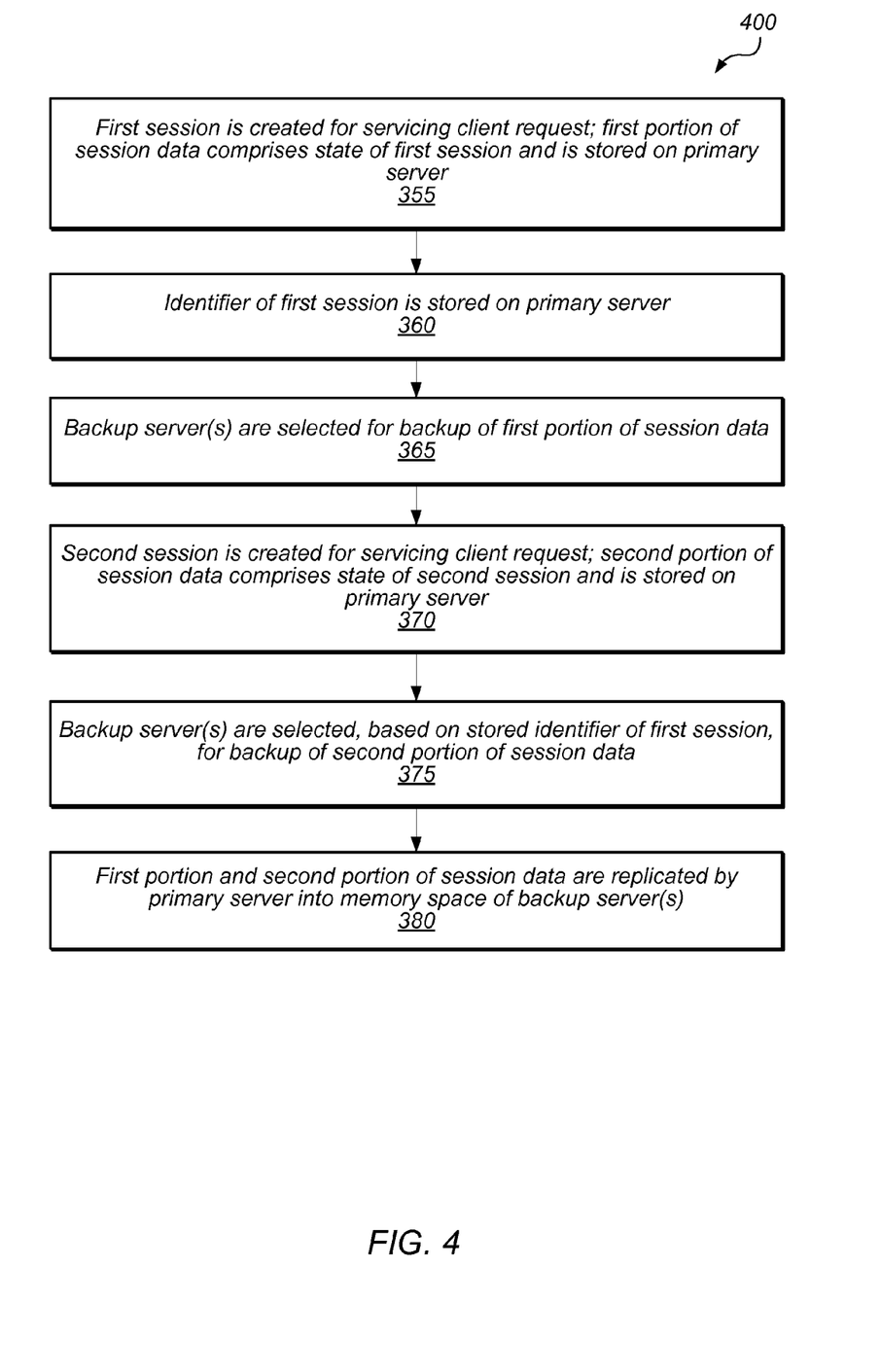
FIG. 4 is a flow diagram illustrating a method for implementing transparent failover with colocation of session state data, according to some embodiments.

FIG. 4 is a flow diagram illustrating a method for implementing transparent failover with colocation of session state data, according to some embodiments. The method of FIG. 4 may be performed by an application server cluster, such as cluster 100 of FIG. 1, which includes multiple server instances (e.g., 200 and 250 of FIG. 2). In some embodiments, some of the method elements shown may be performed concurrently, in a different order than shown, or may be omitted. Additional method elements may also be performed as desired. Any of the method elements described may be performed automatically (i.e., without user intervention).

Method 400 begins when a first session is created for servicing a client request, as shown in 355. The first session is created on a primary server of the server cluster. A first portion of session data comprises a state of the first session and is stored on the primary server. The first portion of session data may be created by or on behalf of a first component (e.g., a first container). For example, the first portion of session data may correspond to web session data 226 of FIG. 2. As shown in 360, an identifier of the first session is stored on the primary server. As shown in 365, one or more backup servers are selected for backup of the first portion of session data. As discussed above, the backup servers may be selected based on a function of the identifier of the first session.

As shown in 370, a second session is created for servicing the client request on the primary server. A second portion of session data comprises a state of the second session and is stored on the primary server. The second portion of session data may be created by or on behalf of a second component (e.g., a second container). For example, the second portion of session data may correspond to EJB session data 227 of FIG. 2. The second portion of the session data may be stored with an identifier of the second session. The identifier of the second session differs from the identifier of the first session. As shown in 375, the one or more backup servers are also selected for backup of the second portion of session data. In some embodiments, the one or more backup servers are selected for backup of the second portion of session data based on the stored identifier of the first session. As shown in 380, the primary server replicates the first portion of session data and the second portion of session data into memory space of the one or more backup servers. For example, the replicated first portion of session data may correspond to web session data 276 of FIG. 2, and the replicated second portion of session data may correspond to EJB session data 277 of FIG. 2.

In one embodiment, a thread-local variable may be used to store the first session identifier of a first container that is handling a request. For example, when an HTTP request is received at a primary server by a web container, a thread-local variable may be set to the value of the session identifier of the current HTTP session. In some embodiments, the thread-local variable may be implemented as a ThreadLocal variable in the Java™ programming language. Each thread that accesses a thread-local variable (e.g., via its get or set method) may have its own, independently initialized copy of the thread-local variable. In the Java™ programming language, ThreadLocal instances are typically private static fields in classes that wish to associate a particular state (e.g., a session identifier) with a thread.

The first container may call a mapping interface supplied by the replication module to determine the one or more backup server instances to be used for replication. In some embodiments, the mapping interface determines the identity of the backup servers by calculating a consistent hash function. As discussed above, identifying the backup servers may comprise computing a hash function based on the session identifier and the current view of the cluster. In some embodiments, the set of backup servers determined for the first container may be based on the session identifier stored in the thread-local variable.

When an additional container (e.g., an EJB container) requests replication of session state data associated with handling the request, the additional container may also call the mapping interface supplied by the replication module to determine the one or more backup server instances to be used for replication. The additional container may supply its own session identifier (differing from the first session identifier) to the mapping function. However, the mapping function may disregard the additional session identifier and instead rely on the thread-local variable. As discussed above, identifying the backup servers may comprise computing a hash function based on a session identifier and the current view of the cluster. When the same session identifier that was used for the first container is used for the one or more additional containers, the hash function will return the same set of one or more backup server instances that was previously returned for the first container. In other words, after the value of the thread-local variable is set to the first session identifier, the mapping interface may use the thread-local variable to return the hash value based on the first session identifier to any additional containers assisting with the request that seek to replicate their session state data. Using the replication module, the one or more additional containers may then replicate their session state data to the same set of backup servers used by the first container. After the response to the request is sent from the primary server to the client, the session identifier in the thread-local variable may be unset.

In this manner, the session state data associated with one or more additional containers (e.g., the EJB container) may be replicated to the same one or more backup server instances as the first container (e.g., the web container). If the primary server subsequently fails, as discussed with reference to FIG. 3, then the failover operation may be carried out efficiently due to the colocation of the replicated session state data. For example, the different types of session state data may be retrieved from a single backup server rather than from different backup servers.

In some embodiments, a HashableKey interface may be used in performing colocation of replicated session state data. When an application (e.g., a web application) seeks to replicate session state data associated with a container, the application may directly employ the replication module. The application may capture the state of a container (e.g., an EJB container) whose data (e.g., EJB session data) is sought to be replicated. Instead of passing a session identifier to the replication module along with the session state data, the application may instead pass an object that implements the HashableKey interface. The HashableKey interface includes a method called getHashKey. Using the getHashKey method, the value of a different session identifier (e.g., a web session identifier) may be returned. The replication module may use the returned value to obtain the set of backup servers to be used in the replication. In this manner, different portions of session state data associated with the same application may be colocated to the same one or more backup server instances.

Figure 5:
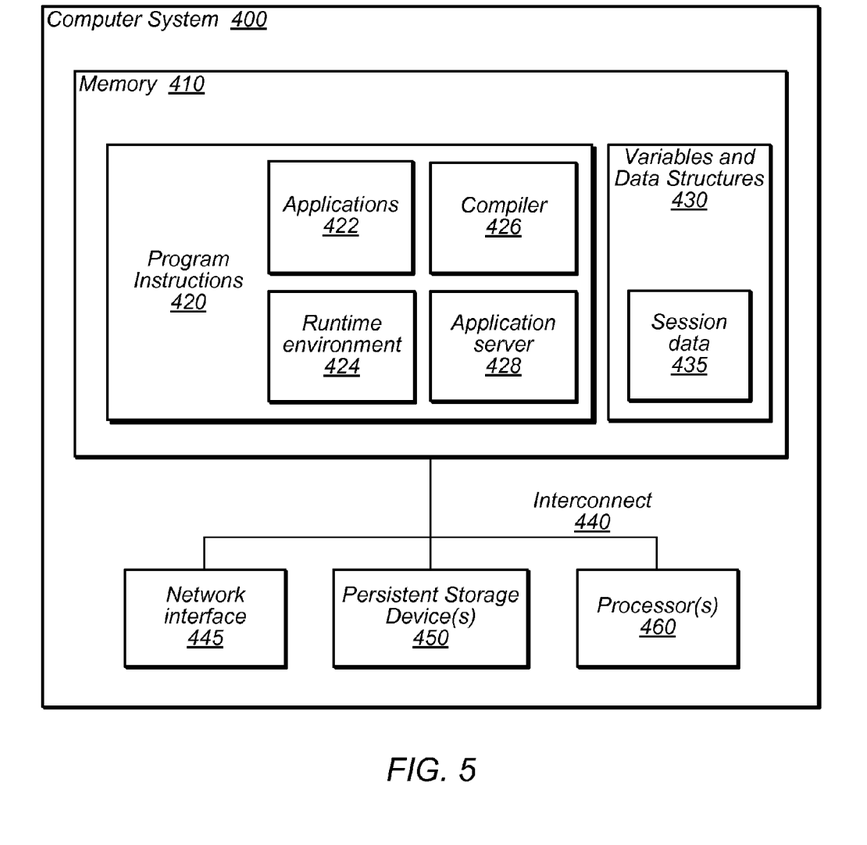
FIG. 5 is a block diagram illustrating a computer system configured to implement transparent failover, according to various embodiments.

FIG. 5 is a block diagram illustrating a computer system configured to implement transparent failover, according to various embodiments. The computer system 400 may correspond to any of various types of devices including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The server instances, applications, containers, and/or code to execute various methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 400 includes various interconnected components. For example, system 400 includes one or more processors 460, each of which may include multiple cores, any of which may be single or multi-threaded. The computer system may include one or more persistent storage devices, such as 450, which may include optical storage, magnetic storage, hard drive, tape drive, and/or solid-state memory, etc. The system may also include a network interface, such as 445, which may facilitate communication with other computers across a network. For example, network interface 445 may facilitate replication layer communications sent as part of implementing transparent failover as described herein. The network interface may also be used to receive client requests and send responses to those requests. As described above, client requests may be received directly from the client, from an intermediary such as a proxy server or load balancer, or from other nodes in the cluster. The computer system may also include one or more memories, such as 410, which may be implemented as one or more of cache, SRAM, DRAM, RDRAM, EDO RAM, DDR RAM, SDRAM, Rambus RAM, EEPROM, etc. Various embodiments may include fewer or additional components not illustrated in FIG. 5 (e.g., video cards, audio cards, additional network interfaces, peripheral devices, a network interface such as an ATM interface, an Ethernet interface, a Frame Relay interface, monitors, keyboards, speakers, etc.).

According to the illustrated embodiment, the network interface 445, persistent storage device 450, one or more processors 460, and memory 410 may be interconnected via interconnect 440. Interconnect 440 may be implemented using various technologies. For example, interconnect 440 may correspond to one or more system buses and/or to one or more point-to-point interconnects in different topologies (e.g., grid, torus, etc.).

One or more of the system memories 410 may contain program instructions 420. Program instructions 420 may be encoded in platform native binary, any interpreted language such as Java™ byte-code, in any high-level programming language such as C/C++, Java™, etc., or in any combination thereof. Program instructions 420 may include instructions executable to implement various applications 422, such as web applications (e.g., corresponding to applications 205 and 255 of FIG. 2).

Program instructions 420 may include one or more application servers 428. Application server 428 may correspond to servers 200 or 250 in FIG. 2. As such, application server 428 may be configured to execute applications 422 and to provide one or more components, such as web container 210 or EJB container 215 shown in FIG. 2. Additionally, application server 428 may include a replication module configured to implement part of a replication layer for transparent failover with echoed failover information, as described herein.

In the illustrated embodiment, program instructions 420 include instructions executable to implement compiler 426, which may be usable to compile source code representations of programs and/or components into an executable form (e.g., native binary or interpreted language). In some embodiments, the compiler 426 may correspond to a just-in-time compiler configured for runtime compilation and/or recompilation of various components defined in program instructions 420.

In the illustrated embodiment, program instructions 420 may also include one or more runtime environments 424. Runtime environments 424 may include a Java™ runtime, standard libraries, and/or various other runtime support mechanisms, as described herein.

In some embodiments, memory 410 may include any number of in-memory variables and/or data structures, such as 430. Variables and data structures may comprise any number of variables and/or data structures allocated by executing programs, such as applications 422, server 428, compiler 426, and runtime environments 424.

Variables and data structures 430 include session data 435. Session data 435 may include web session objects, stateful EJBs, and/or any object associated with a user's session. In some cases, session data 435 may include replicated session data from another server in the cluster.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer-implemented method, comprising:
servicing a client request by a cluster of servers, wherein the servicing includes:
creating a first session for servicing the client request on a primary server of the servers, wherein a first portion of session data comprises a state of the first session and is stored on the primary server;
storing an identifier of the first session on the primary server;
selecting one or more backup servers of the servers for backup of the first portion of the session data;
creating a second session for servicing the same client request on the primary server, wherein a second portion of the session data comprises a state of the second session and is stored on the primary server;
selecting the same one or more backup servers for backup of the second portion of the session data, wherein the selecting is performed based on the stored identifier of the first session; and
the primary server replicating the first portion of the session data and the second portion of the session data into memory space of the same one or more backup servers.

2. The method of claim 1, wherein the identifier of the first session is stored in a thread-local variable.

3. The method of claim 1, further comprising:
the primary server sending a response to the client request to a client of the cluster of servers, wherein the response includes an indication of the one or more backup servers.

4. The method of claim 3, further comprising:
receiving a subsequent request at the cluster from the client, wherein the subsequent request includes the indication of the one or more backup servers;
in response to determining that the primary server is unavailable to service the subsequent request, determining a recovery server from among the one or more backup servers indicated by the subsequent request; and
the recovery server servicing the subsequent request.

5. The method of claim 4, wherein the subsequent request encodes the indication of the one or more backup servers in a URL in the response or encodes the indication of the one or more backup servers in a cookie.

6. The method of claim 1, wherein the one or more backup servers are selected for backup of the first portion of the session data and for backup of the second portion of the session data by calculating a function of the identifier of the first session.

7. The method of claim 1, further comprising:
determining whether a new server joins the cluster of servers;
selecting the new server for backup of the first portion of the session data and the second portion of the session data and
replicating the first portion of the session data and the second portion of the session data into memory space of the new server.

8. A system, comprising:
a cluster of computers executing a plurality of servers, wherein the servers comprise a primary server configured to service a client request, wherein servicing the client request includes:
creating a first session for servicing the client request on the primary server, wherein a first portion of session data comprises a state of the first session and is stored on the primary server;
storing an identifier of the first session on the primary server;
selecting one or more backup servers of the plurality of servers for backup of the first portion of the session data;
creating a second session for servicing the same client request on the primary server, wherein a second portion of the session data comprises a state of the second session and is stored on the primary server;
selecting the same one or more backup servers for backup of the second portion of the session data, wherein the selecting is performed based on the stored identifier of the first session; and
the primary server replicating the first portion of the session data and the second portion of the session data into memory space of the same one or more backup servers.

9. The system of claim 8, wherein the identifier of the first session is stored in a thread-local variable.

10. The system of claim 8, wherein the cluster of computers is further configured to:
send a response to the client request from the primary server to a client of the plurality of servers, wherein the response includes an indication of the one or more backup servers.

11. The system of claim 10, wherein the cluster of computers is further configured to:
receive a subsequent request from the client, wherein the subsequent request includes the indication of the one or more backup servers;
in response to determining that the primary server is unavailable to service the subsequent request, determine a recovery server from among the one or more backup servers indicated by the subsequent request; and
service the subsequent request using the recovery server.

12. The system of claim 11, wherein the subsequent request encodes the indication of the one or more backup servers in a URL in the response or encodes the indication of the one or more backup servers in a cookie.

13. The system of claim 8, wherein the one or more backup servers are selected for backup of the first portion of the session data and for backup of the second portion of the session data by calculating a function of the identifier of the first session.

14. The system of claim 8, wherein the first session is created by a web container, and wherein the second session is created by an Enterprise Java Beans (EJB) container.

15. A non-transitory storage medium storing program instructions executable by a computer to implement:
a primary server configured to service a client request from a client, wherein the servicing comprises:
creating a first session to service the client request, wherein a first portion of session data comprises a state of the first session and is stored on the primary server;
storing an identifier of the first session;
selecting one or more backup servers for backup of the first portion of the session data;
creating a second session to service the same client request, wherein a second portion of the session data comprises a state of the second session and is stored on the primary server;
selecting the same one or more backup servers for backup of the second portion of the session data, wherein the selecting is performed based on the stored identifier of the first session; and replicating the first portion of the session data and the second portion of the session data into memory space of the same one or more backup servers.

16. The storage medium of claim 15, wherein the identifier of the first session is stored in a thread-local variable.

17. The storage medium of claim 15, wherein the servicing further comprises:
sending a response to the request to the client, wherein the response includes an indication of the one or more backup servers.

18. The storage medium of claim 17, wherein the program instructions are further executable to implement:
receiving a subsequent request from the client, wherein the subsequent request includes the indication of the one or more backup servers; and
in response to determining that the primary server is unavailable to service the subsequent request, determining a recovery server from among the one or more backup servers indicated by the subsequent request.

19. The storage medium of claim 18, wherein the subsequent request encodes the indication of the one or more backup servers in a URL in the response or encodes the indication of the one or more backup servers in a cookie.

20. The storage medium of claim 15, wherein the one or more backup servers are selected for backup of the first portion of the session data and for backup of the second portion of the session data by calculating a function of the identifier of the first session.

\* \* \* \* \*